(12) United States Patent
Hirai et al.

(10) Patent No.: US 8,021,054 B2
(45) Date of Patent: Sep. 20, 2011

(54) WHEEL BEARING APPARATUS FOR A VEHICLE

(75) Inventors: Isao Hirai, Iwata (JP); Takayasu Takubo, Iwata (JP); Kiyotake Shibata, Iwata (JP); Syougo Suzuki, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/684,186

(22) Filed: Jan. 8, 2010

(65) Prior Publication Data
US 2010/0111458 A1 May 6, 2010

Related U.S. Application Data (63) Continuation of application No. PCT/JP2008/001803, filed on Jul. 7, 2008.

(30) Foreign Application Priority Data

Jul. 9, 2007 (JP) ................................. 2007-179277

(51) Int. Cl.
*F16C 19/08* (2006.01)
(52) U.S. Cl. ........................................................ 384/544
(58) Field of Classification Search .................. 384/544, 384/589; 301/105.1, 124.1
See application file for complete search history.

(56) References Cited

U.S. PATENT DOCUMENTS

| 4,764,153 | A * | 8/1988 | Jacob ............................. 384/544 |
| 4,784,441 | A * | 11/1988 | Welschof et al. ............. 384/589 |
| 5,727,886 | A * | 3/1998 | Hata et al. ..................... 384/544 |
| 2003/0025385 | A1 | 2/2003 | Morimoto et al. |
| 2005/0184582 | A1 | 8/2005 | Morimoto et al. |
| 2006/0033381 | A1 | 2/2006 | Suma |
| 2006/0110087 | A1* | 5/2006 | Igari et al. ..................... 384/544 |
| 2006/0133708 | A1* | 6/2006 | Meeker et al. ................ 384/544 |

FOREIGN PATENT DOCUMENTS

| EP | 1 277 598 | 10/2008 |
| JP | 2003-025802 | 1/2003 |
| JP | 2005-053272 | 3/2005 |
| JP | 2006-052816 | 2/2006 |
| JP | 2007-091078 | 4/2007 |
| JP | 2008-144946 | 6/2008 |

* cited by examiner

*Primary Examiner* — Thomas R Hannon
(74) *Attorney, Agent, or Firm* — Harness, Dickey & Pierce, P.L.C.

(57) ABSTRACT

A vehicle wheel bearing apparatus has an outer member with a body mounting flange, an inner member and double row rolling elements freely rollably contained between the inner and outer raceway surfaces of the inner and outer members. The body mounting flange is formed with a plurality of screw apertures. An inner side flange surface of the body mounting flange is formed by machining to have a flat vertical surface relative to a longitudinal axis of a wheel hub. An outer side flange surface of the body mounting flange is formed by forging to have a tapered surface of a predetermined inclined angle. Thus, the thickness of the body mounting flange is gradually reduced radially outward.

7 Claims, 9 Drawing Sheets

PRIOR ART

[Fig 9]

PRIOR ART

WHEEL BEARING APPARATUS FOR A VEHICLE

CROSS-REFERENCE TO RELATED APPLICATIONS

This application is a continuation of International Application No. PCT/JP2008/001803, filed Jul. 7, 2008, which claims priority to Japanese Application No. 2007-179277, filed Jul. 9, 2007. The disclosures of the above applications are incorporated herein by reference.

FIELD

The present disclosure relates to a vehicle wheel bearing apparatus to rotatably support a wheel of an automobile and, more particularly, to a vehicle wheel bearing apparatus intended to reduce the size and weight of an outer member of the wheel bearing apparatus.

BACKGROUND

In general, the wheel bearing apparatus to support a vehicle wheel is adapted to rollably support a wheel hub to mount the wheel, via a rolling bearing, and includes driving wheel and driven wheel types. For structural reasons, an inner ring rotation type is used for the driving wheel type. Both the inner ring rotation type and an outer ring rotation type are used for the driven wheel type. A double row angular contact ball bearing has been used in the wheel bearing apparatus since it has a desirable bearing rigidity, durability against misalignment, and a small rotational torque that contributes to improving fuel consumption.

Wheel bearing apparatus is generally classified into first through fourth generation types. In a first generation wheel bearing, it includes a double row angular contact ball bearing fit between a knuckle, forming part of a suspension apparatus, and a wheel hub. In a second generation type, a body mounting flange or a wheel mounting flange is directly formed on an outer circumference of an outer member. In a third generation type, one inner raceway surface is directly formed on an outer circumference of a wheel hub. In a fourth generation type, the inner raceway surfaces are directly formed, respectively, on outer circumferences of a wheel hub and an outer joint member of a constant velocity joint.

Figure 8:
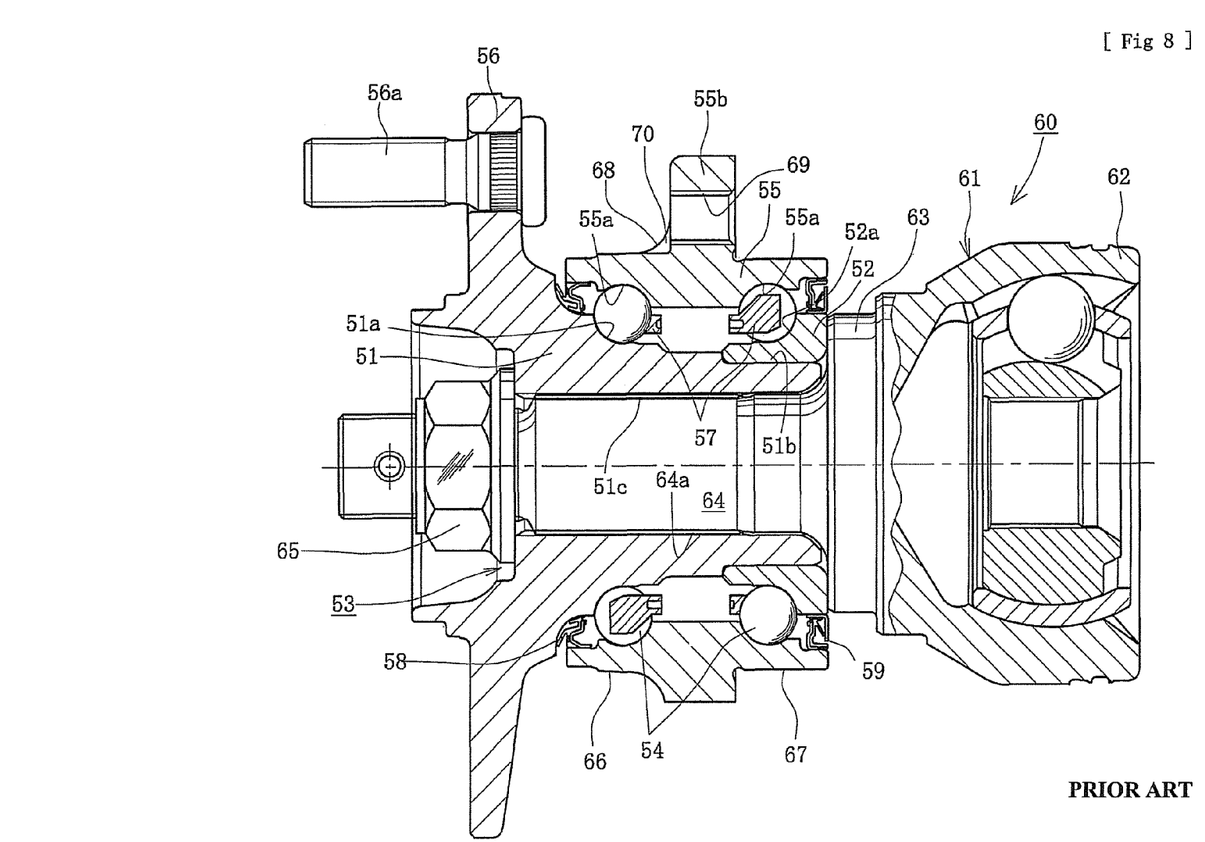
FIG. 8 is a longitudinal section view of a prior art vehicle wheel bearing apparatus.

FIG. 8 shows one example of a structure of the wheel bearing apparatus. This wheel bearing apparatus is a third generation type used for a driving wheel. It includes an inner member 53 with a wheel hub 51 and an inner ring 52. An outer member 55 is fit onto the inner member 53 via double row balls 54, 54. In the descriptions below, the term "outer side" defines a side that is positioned outside of a vehicle body (left-hand side of FIG. 8) and the term "inner side" defines a side that is positioned inside of a vehicle body (right-hand side of FIG. 8) when the wheel bearing apparatus is mounted on the vehicle body.

The wheel hub 51 is integrally formed with a wheel mounting flange 56 that extend at its outer side end. Hub bolts 56a are secured onto the wheel mounting flange 56 equidistantly along its circumference. The wheel hub 51 is formed with an outer side inner raceway surface 51a on its outer circumference. A cylindrical portion 51b axially extends from the inner raceway surface 51a. The inner ring 52 is formed with an inner side inner raceway surface 52a on its outer circumference and press-fit onto the cylindrical portion 51b.

The outer member 55 is integrally formed with a body mounting flange 55b on its outer circumference. The body mounting flange 55b is to be mounted on a knuckle (not shown). The outer member inner circumference has double row outer raceway surfaces 55a, 55a. Double row balls 54, 54 are contained between the outer raceway surfaces 55a, 55a of the outer member 55 and the opposing inner raceway surfaces 51a, 52a. The balls 54, 54 are rollably held by cages 57, 57. Seals 58, 59 are mounted on both ends of the outer member 55 to prevent leakage of lubricating grease sealed within the bearing. Also, the seals 58, 59 prevent the entry of rainwater or dusts into the bearing from the outside. The circumference of the body mounting flange is discontinuously formed with three or four projections. Each projection is formed with a screw aperture 69 for a bolt fastened to a knuckle.

A serration 51c is formed on the inner circumference of the wheel hub 51. An outer joint member 61, forming part of a constant velocity universal joint 60, is fit into the serration 51c. The outer joint member 61 has an integral cup-shaped mouth portion 62, a shoulder portion 63, forming a bottom of the mouth portion 62, and a stem portion 64 that axially extends from the shoulder portion 63. A serration 64a, formed on the outer circumference of the stem portion 64, engages the serration 51c of the wheel hub 51. The outer joint member 61 is axially separably connected to the wheel hub 51 by a securing nut 65. The outer joint shoulder portion 63 abuts against the inner ring 52.

Figure 9:
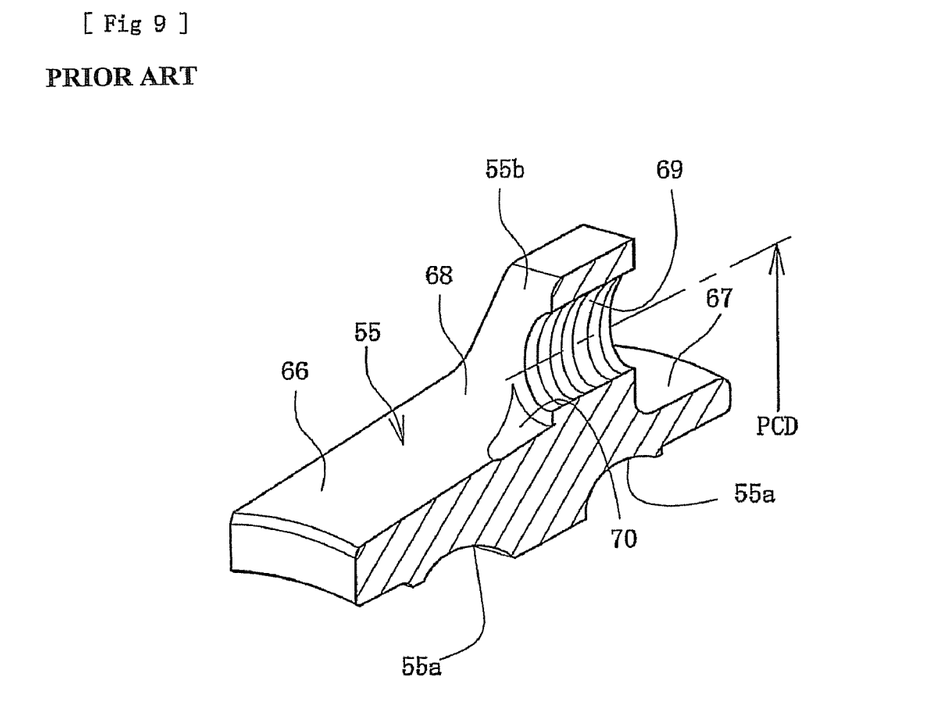
FIG. 9 is a partially enlarged perspective view of a portion of the outer member of FIG. 8.

An outer circumferential surface 66 of the outer member 55 at the outer side of the body mounting flange 55b is formed with a slight taper and its inner side outer circumference is formed with a cylindrical surface 67 adapted to be fit into the knuckle, as shown in FIG. 9. In addition, a corner portion 68, between the body mounting flange 55b and the outer circumferential surface 66, is formed by forging as a rounded corner with a circular arc cross-section. The inner side fitting surface 67 is formed with a diameter smaller than that of the outer side circumferential surface 66. Thus, bolts fastened to the knuckle can be screwed into the screw apertures 69 from the side of the fitting surface 67. An axially extending recess 70 is milled into the corner 68 at a position corresponding to the screw aperture 69. The screw aperture 69 is formed by tapping after a hole is prepared by drilling.

This remarkably reduces the pitch circle diameter (PCD) of the screw apertures 69. Thus, this reduces the size and weight of the bearing apparatus without diminishing the strength and rigidity of the outer member 55. Also, it enables bolts to be fastened without interfering with the wheel mounting flange 56 of the wheel hub 51 to improve workability during assembly and disassembly of the bearing apparatus. See, Japanese Laid-open Patent Publication No. 91078/2007.

In recent years, there has been a strong desire to improve vehicle fuel consumption by saving material and preventing pollution. In addition to improving fuel consumption, by reducing the size and weight of the bearing apparatus, it is desirable to further reduce the weight of the bearing apparatus to improve the ride comfort by reducing the unsprung mass and to improve the driving stability by improving the road gripping performance of the tires.

SUMMARY

It is therefore an object of the present disclosure to provide a wheel bearing apparatus that can reduce its size and weight without reducing the strength and rigidity of the outer member.

To achieve the object, a vehicle wheel bearing apparatus comprises an outer member formed with a body mounting flange on its outer circumference. The body mounting flange is to be mounted on a knuckle to form part of a suspension apparatus. The outer member inner circumference includes double row outer raceway surfaces. An inner member includes a wheel hub and at least one inner ring or an outer joint member of a constant velocity universal joint. The wheel hub is formed on one end with a wheel mounting flange. The wheel hub other end includes an axially extending cylindrical portion. The inner ring is press-fit onto the cylindrical portion of the wheel hub. The inner member is formed with inner raceway surfaces on its outer circumference. The inner raceway surfaces oppose the double row outer raceway surfaces. Double row rolling elements are freely rollably contained between the inner and outer raceway surfaces of the inner and outer members. The body mounting flange is formed with a plurality of screw apertures that receive fastening bolts. An inner side flange surface of the body mounting flange is formed by machining to have a flat vertical surface relative to a longitudinal axis of the wheel hub. An outer side flange surface of the body mounting flange is formed by forging to have a tapered surface of a predetermined inclined angle. Thus, the thickness of the body mounting flange is gradually reduced radially outward.

In wheel bearing apparatus of the second through fourth generation types, the outer member is integrally formed, on its outer circumference, with a body mounting flange to be mounted on a knuckle. An inner side flange surface of the body mounting flange is formed by machining to have a flat vertical surface relative to a longitudinal axis of the wheel hub. An outer side flange surface of the body mounting flange is formed by forging with a tapered surface of a predetermined inclined angle. Thus, the thickness of the body mounting flange gradually reduces radially outward. Accordingly, it is possible to reduce the size and weight of the wheel bearing apparatus and to fill throughout the body mounting flange to its tip end with blank material during forging and thus to improve the workability during forging. In addition, it is possible to suppress the amount of burrs generated during forging and thus to improve the accuracy during forging and machining and increase the life of the molds.

The outer side surface of the body mounting flange has a flat vertical surface relative to a longitudinal axis of the wheel hub that extends radially outward from the base portion of the body mounting flange. This makes it possible to accurately measure the thickness of the body mounting flange and thus to speedily and easily carry out control of the dimensions.

The inclined angle is within a range of 5-20°. This reduces the weight of the outer member and has a desirable fastening strength without the effective length of the screw aperture being limited.

The thickness of the body mounting flange at the center of the screw aperture is set to have six or more times the nominal thread pitch of the screw aperture. This makes it possible to assure the strength of the wheel mounting flange and the fastening strength of the bolts.

The circumference of the body mounting flange is discontinuously formed with a plurality of projections. Each projection includes a screw aperture. The outer member is formed at the inner side of the body mounting flange with a cylindrical outer fitting surface to be fit into the knuckle. The outer side of the body mounting flange has a slightly tapered outer circumferential surface. A transiting portion, between the slightly tapered outer circumferential surface and the body mounting flange, is formed by forging. It has a corner portion continuous to the screw apertures with a circular arc cross-section. This reduces the size and weight of the outer member without diminishing the strength and rigidity of the outer member.

An axially extending recess is formed in the corner portion at a position corresponding to each screw aperture. This enables both prepared holes and the screw apertures to be formed without any interference with the corner portion during machining. The PCD of the screw apertures is set small so that a portion of each screw aperture opens to the recess. Accordingly, the PCD of the screw apertures can be set extremely small. Thus, a further reduction of the weight of the bearing apparatus can be achieved without diminishing the strength and rigidity of the outer member.

The diameter of the cylindrical outer fitting surface is smaller than that of the slightly tapered outer circumferential surface. This enables the bolts to be inserted from the side of the fitting surface and thus to fasten the bolts without interfering with the wheel mounting flange of the wheel hub. Thus, this improves the workability during assembly and disassembly of the wheel bearing apparatus.

The bearing apparatus for a wheel of a vehicle comprises an outer member formed with a body mounting flange on its outer circumference. The body mounting flange is to be mounted on a knuckle forming part of a suspension apparatus. The outer member inner circumference has double row outer raceway surfaces. An inner member includes a wheel hub and at least one inner ring or an outer joint member of a constant velocity universal joint. The wheel hub is formed on one end with a wheel mounting flange and on its other end with an axially extending cylindrical portion. The inner ring is press-fit onto the cylindrical portion of the wheel hub. The inner member is formed with inner raceway surfaces on its outer circumference. The inner raceway surfaces oppose the double row outer raceway surfaces. Double row rolling elements are freely rollably contained between the inner and outer raceway surfaces of the inner and outer members. The body mounting flange is formed with a plurality of screw apertures. Fastening bolts are screwed into the screw apertures. An inner side flange surface of the body mounting flange is formed by machining to have a flat vertical surface relative to a longitudinal axis of the wheel hub. An outer side flange surface of the body mounting flange is formed by forging to have a tapered surface of a predetermined inclined angle. Thus, the thickness of the body mounting flange is gradually reduced radially outward. Thus, it is possible to reduce the size and weight of the wheel bearing apparatus and to fill throughout the body mounting flange to its tip end with blank material during forging. Thus, this improves workability during forging. In addition, it is possible to suppress the amount of burrs generated during forging and improve the accuracy during forging and machining and add to mold life.

A vehicle wheel bearing apparatus comprises an outer member formed with a body mounting flange on its outer circumference. The body mounting flange is to be mounted on a knuckle forming part of a suspension apparatus. The outer member inner circumference has double row outer raceway surfaces. An inner member includes a wheel hub and an inner ring. The wheel hub is formed on its one end with a wheel mounting flange. The wheel hub outer circumference has one inner raceway surface that opposes one of the double row outer raceway surfaces. A cylindrical portion axially extends from the inner raceway surface. The inner ring is press-fit onto the cylindrical portion of the wheel hub. The inner ring outer circumference has the other inner raceway surface that opposes the other of the double row outer raceway surfaces. Double row rolling elements are freely rollably contained between the inner and outer raceway surfaces of the inner and outer members. The body mounting flange is formed with a plurality of screw apertures. Fastening bolts are screwed into the plurality of screw apertures. An inner side flange surface of the body mounting flange is formed by machining to have a flat vertical surface relative to a longitudinal axis of the wheel hub. An outer side flange surface of the body mounting flange is formed by forging to have a tapered surface with an inclined angle of 5-20°. Thus, the thickness of the body mounting flange is gradually reduced radially outward. The thickness of the body mounting flange at the center of the screw aperture is set to have six or more times the nominal thread pitch of the screw aperture.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

A preferred embodiments of the present disclosure will be hereinafter described with reference to the drawings.

Figure 1:
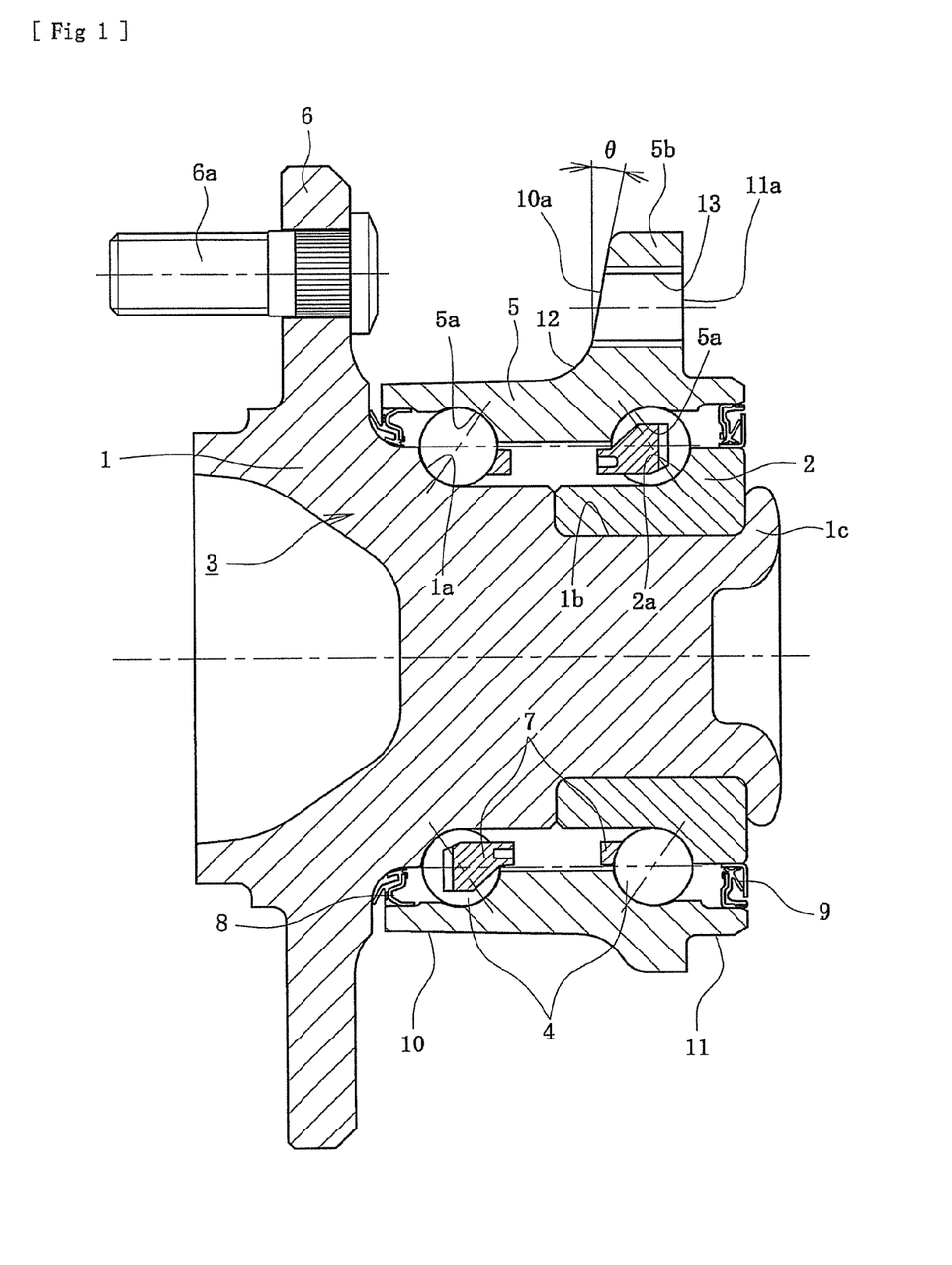
FIG. 1 is a longitudinal section view of a first embodiment of the vehicle wheel bearing apparatus.
Figure 2:
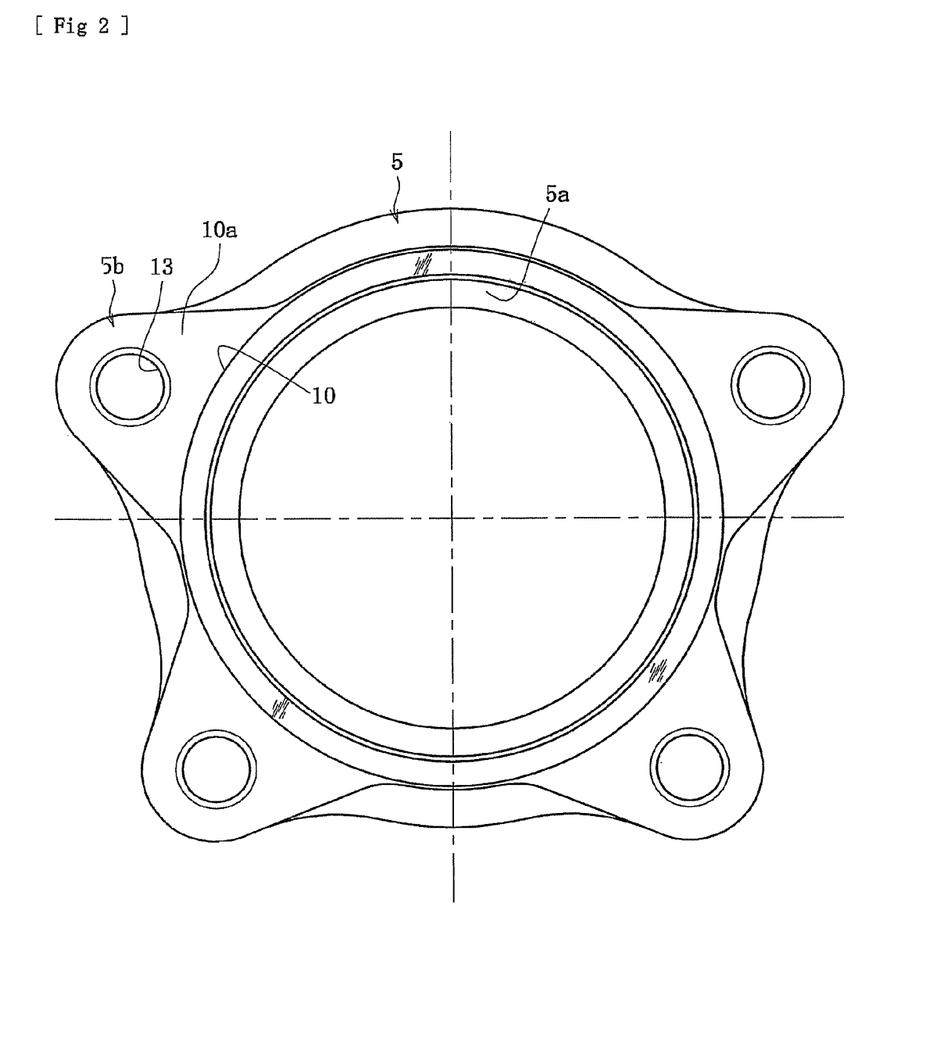
FIG. 2 is a left side elevation view of FIG. 1 of the outer member.
Figure 3:
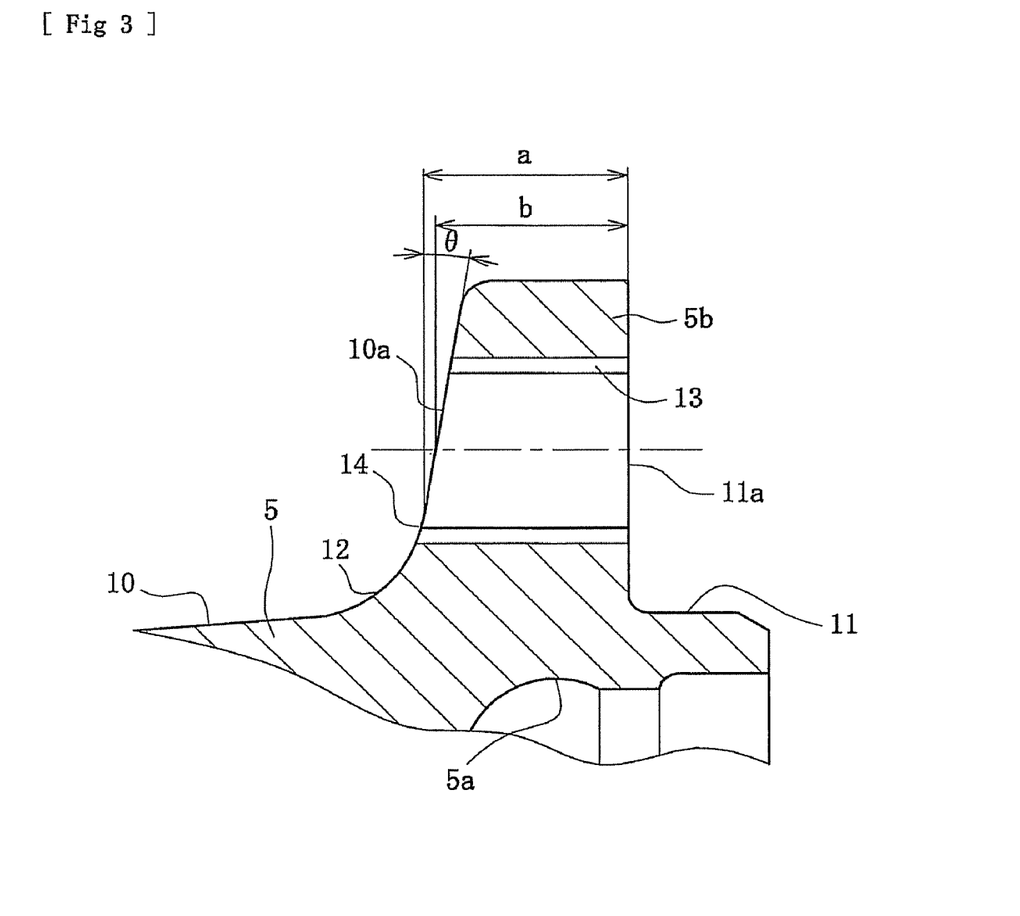
FIG. 3 is a partially enlarged view of the body mounting flange of the outer member of FIG. 1.

FIG. 1 is a longitudinal section view of a first embodiment of the vehicle wheel bearing apparatus. FIG. 2 is a left side elevation view of the outer member of FIG. 1. FIG. 3 is a partially enlarged view of the body mounting flange of the outer member of FIG. 1.

The bearing apparatus for a vehicle wheel is a third generation type used for a driven wheel. It includes an inner member 3 with a wheel hub 1 and an inner ring 2. An outer member 5 is fit onto the inner member 3 via double row rolling elements (balls) 4, 4.

The wheel hub 1 is integrally formed with a wheel mounting flange 6 at its outer side end. Hub bolts 6a are arranged on the wheel mounting flange 6 equidistantly along its periphery. The wheel hub 1 is formed with an outer side inner raceway surface 1a on its outer circumference. A cylindrical portion 1b extends from the inner raceway surface 1a. The inner ring 2 is formed with an inner side inner raceway surface 2a on its outer circumference. The inner ring 2 is press-fit onto the cylindrical portion 1b of the wheel hub 1 via a predetermined interference. The inner ring 2 is axially secured on the wheel hub 1 under a bearing preload condition by a caulked portion 1c. The caulked portion 1c is formed by plastically deforming the end of the cylindrical portion 1b radially outward. This forms a so-called "self-retaining structure". This makes it possible to reduce the size and weight of the wheel bearing apparatus and antinomically improves the rigidity and durability of the wheel hub 1.

The outer member 5 is made of medium/high carbon steel including carbon of 0.40-0.80% by weight such as S53C. It is integrally formed with a body mounting flange 5b on its outer circumference. The body mounting flange 5b is to be mounted on a knuckle (not shown) forming part of a suspension apparatus of a vehicle. The outer member inner circumference has double row outer raceway surfaces 5a, 5a that oppose the double row inner raceway surfaces 1a, 2a. The double row outer raceway surfaces 5a, 5a are hardened by high frequency induction quenching to have a surface hardness of 58-64 HRC. Double row rolling elements 4, 4 are contained between the double row outer raceway surfaces 5a, 5a of the outer member 5 and the double row inner raceway surfaces 1a, 2a. The rolling elements are rollably held by cages 7, 7. Seals 8, 9 are mounted within annular openings formed between the outer member 5 and the inner member 3. The seals 8, 9 prevent leakage of grease contained in the bearing and entry of rainwater and dusts into the bearing from the outside.

The circumference of the body mounting flange 5b of the outer member 5 is discontinuously formed with a plurality (herein four) of projections. Each projection includes a screw aperture 13 as shown in FIG. 2. The outer member 5 is secured to the knuckle by fastening bolts (not shown).

The wheel hub 1 is made of medium/high carbon steel including carbon of 0.40-0.80% by weight such as S53C. It is hardened by high frequency induction quenching so that a region from a seal land portion, with which the outer side seal 8 contacts, to the cylindrical portion 1b, via the inner raceway surface 1a, is hardened to have a surface hardness of 58-64 HRC. The caulked portion 1c is not quenched and remains as is with its surface hardness after forging of 25 HRC or less. The inner ring is formed of high carbon chrome bearing steel such as SUJ2. It is dip hardened to its core to have a hardness of 58-64 HRC. Accordingly, the rigidity of the wheel hub 1 is improved and the fretting wear between the wheel hub 1 and the inner ring 2 can be prevented. Thus, the durability of the wheel hub 1 can be improved. In addition, the workability during plastic deformation of the caulking portion 1c can be improved and the generation of micro cracks in the caulked portion 1c during the caulking process can be prevented.

Figure 1A:
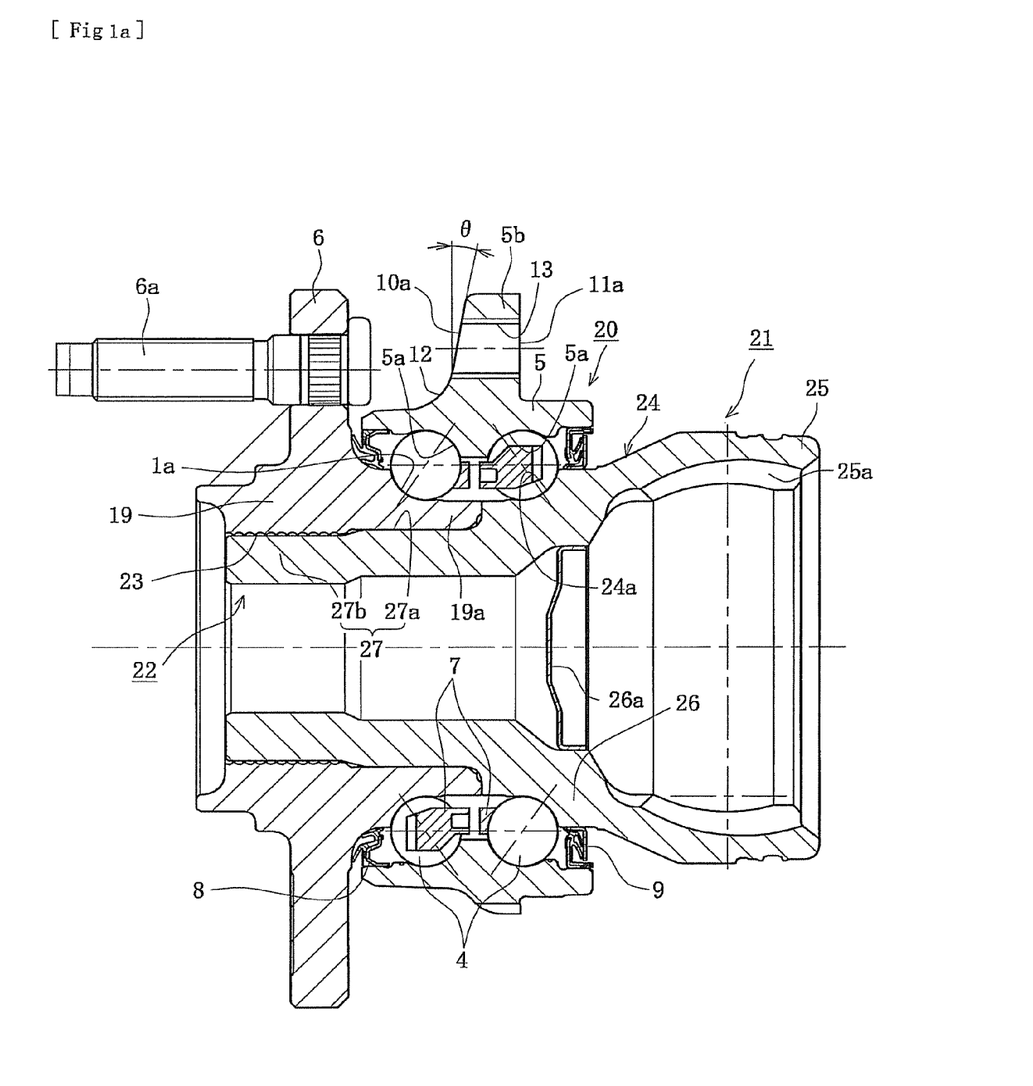
FIG. 1(a) is a longitudinal section view with the constant velocity joint.

FIG. 1(a) illustrates the wheel bearing apparatus like that of FIG. 1 with the addition of a constant velocity joint 21. The reference numerals identifying the same elements in FIG. 1 are used in FIG. 1(a).

The wheel hub 19 includes a cylindrical portion 19a. The cylindrical portion 19a includes a bore extending through the wheel hub 19. The wheel hub 19 includes an irregular portion 23 of the bore wall to secure the wheel hub with the constant velocity joint 21 by swaging. The constant velocity joint 21 includes an outer joint member 24 that includes an inner race way surface 24a opposite the outer race way surface 4a. Additionally, the constant velocity joint 21 includes a mouth portion 25 with a track groove 25a, shoulder 26 and shaft portion 27. The shaft portion 27 includes a spigot portion 27a and a fitting portion 27b. The fitting portion 27b is expanded to contact the irregular portion 23 to secure the constant velocity joint 21 with the wheel hub 19. Additionally, the constant velocity joint 21 includes an end cap 26a.

Although it is shown in an illustrated example using a double row angular contact ball bearing as rolling elements 4, 4, it may be possible to use tapered rollers as the rolling elements. It is shown as a structure of the third generation type in the illustrated example. However, the present disclosure may be applied to a wheel bearing apparatus of the second or fourth generation type.

An outer circumferential surface 10 of the outer member 5 at the outer side of the body mounting flange 5b is formed with a slightly tapered surface. Its inner side outer circumference is formed as a cylindrical surface 11, to be fit into the knuckle. In addition, a corner portion, between the body mounting flange 5b and the outer circumferential surface 10, is formed by forging as a rounded corner 12 with a circular arc cross-section. The inner side fitting surface 11 may be formed with a diameter smaller than that of the outer side circumferential surface 10. The body mounting flange 5b is formed with screw apertures 13. A portion of the screw apertures is continuous to the corner portion 12. Thus, it is possible to insert fastening bolts (not shown) into the screw apertures 13 and fasten them to the knuckle.

As shown in FIG. 3, an inner side flange surface 11a of the body mounting flange 5b is formed by machining to have a flat vertical surface relative to a longitudinal axis of the wheel hub 1'. An outer side surface 10a of the body mounting flange 5b is formed by forging to have a tapered surface of a predetermined inclined angle θ. Thus, the thickness "a" of the body mounting flange 5b at the base portion 14 gradually reduces radially outward. This makes it possible to reduce the size and weight of the wheel bearing apparatus and to fill throughout the body mounting flange 5b to its tip end with blank material during forging. Thus, this improves the workability during forging. In addition, it is possible to suppress the amount of burrs generated during forging and thus to improve the accuracy during forging and machining and improve the life of the molds.

The inclined angle θ of the outer side flange surface 10a is set within a range of 5-20°. This is because the effective length would be limited and thus the fastening strength would be detracted if the inclined angle θ exceeds 20°. On the contrary, the effect of the weight reduction would be scarcely achieved if the inclined angle θ is less than 5°. Although the outer side flange surface 10a is shown as a flat tapered surface, it may be formed by a conical surface having its center on the axis of the wheel bearing.

In addition the thickness "b" of the body mounting flange 5b at the center of the screw aperture 13 is set to have six or more times, preferably more than eight times, the nominal thread pitch of the screw aperture 13 (fastening bolt). This makes it possible to assure the strength of the wheel mounting flange and the fastening strength of the bolts.

Figure 4:
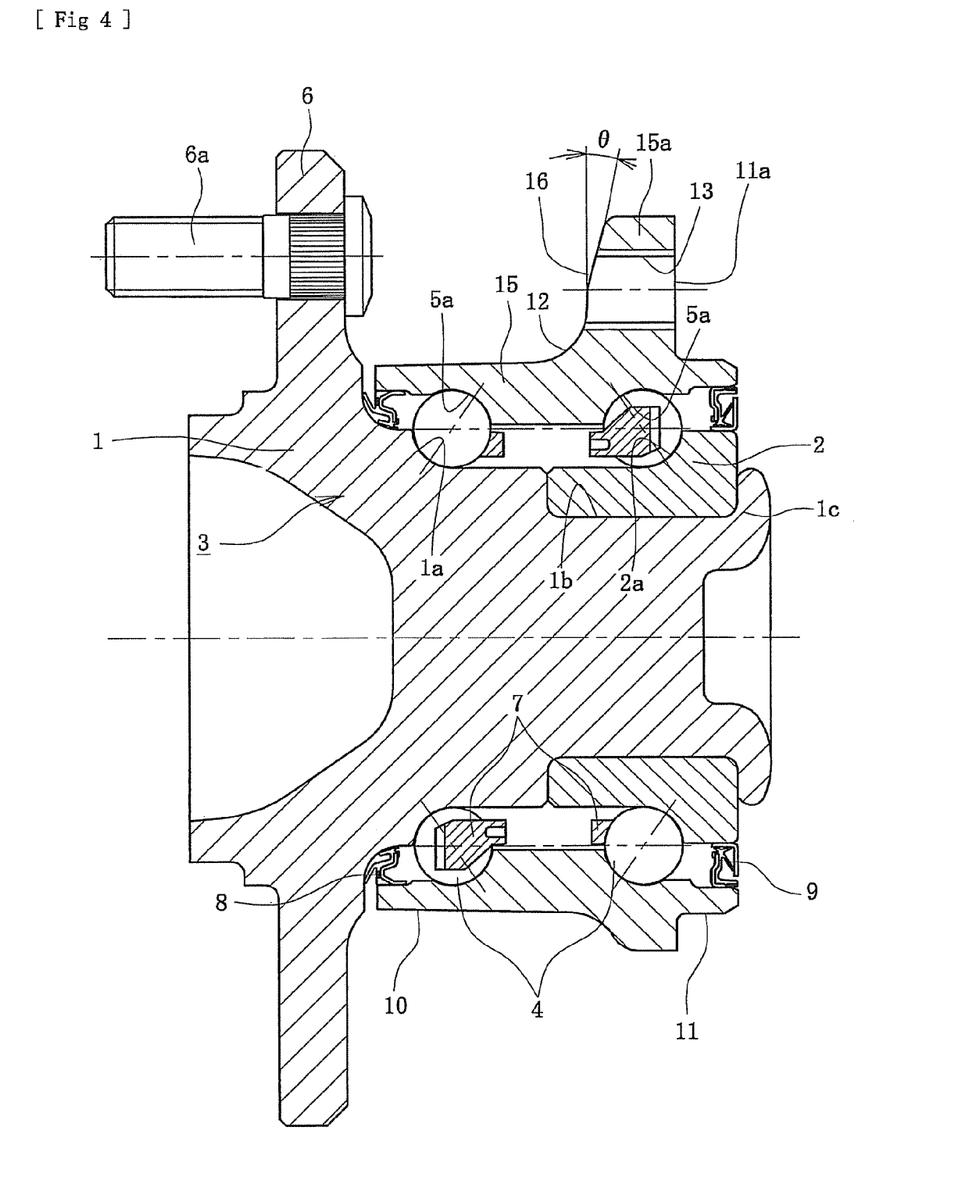
FIG. 4 is a longitudinal section view of a second embodiment of the vehicle wheel bearing apparatus.
Figure 5:
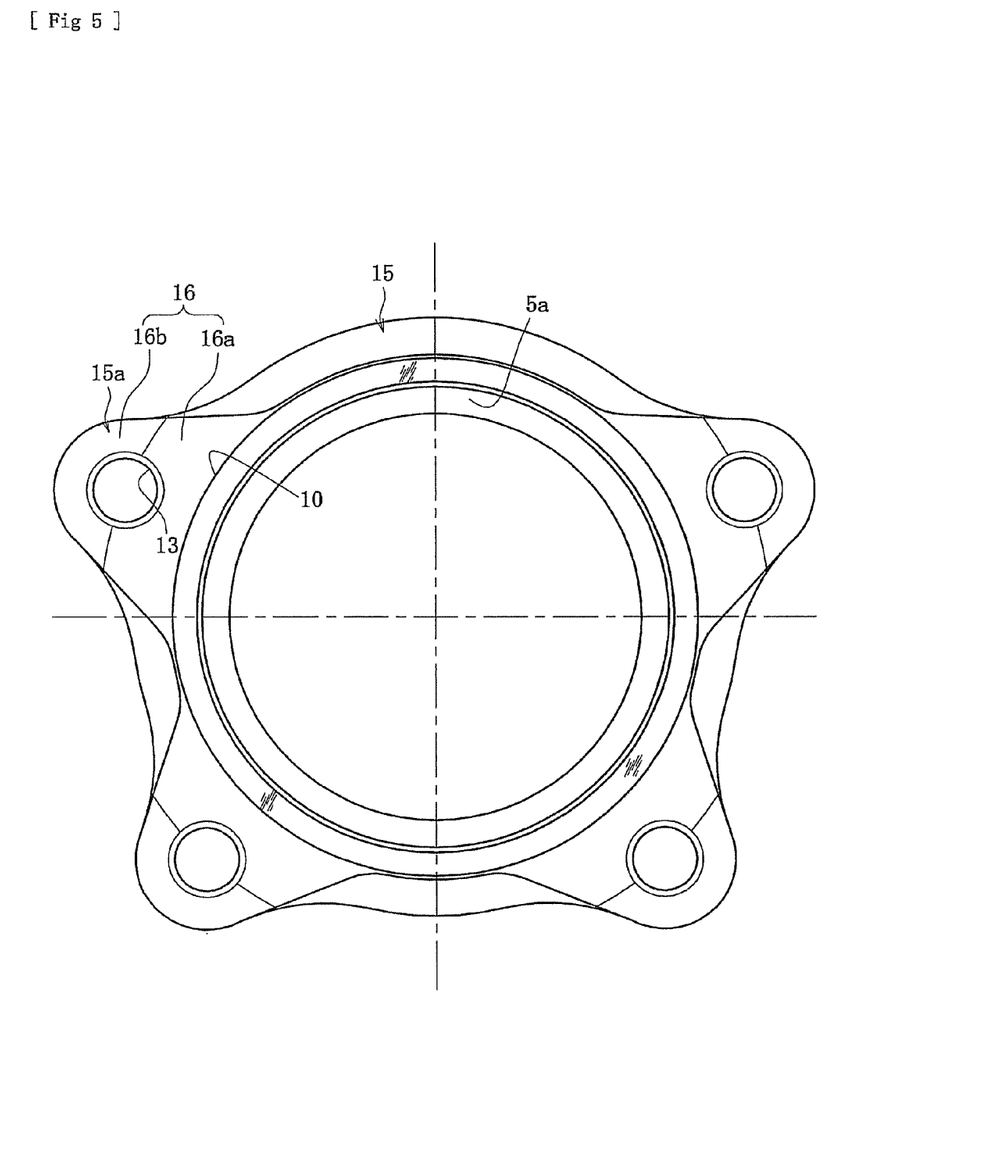
FIG. 5 is a left side elevation view of FIG. 4 of the outer member.
Figure 6:
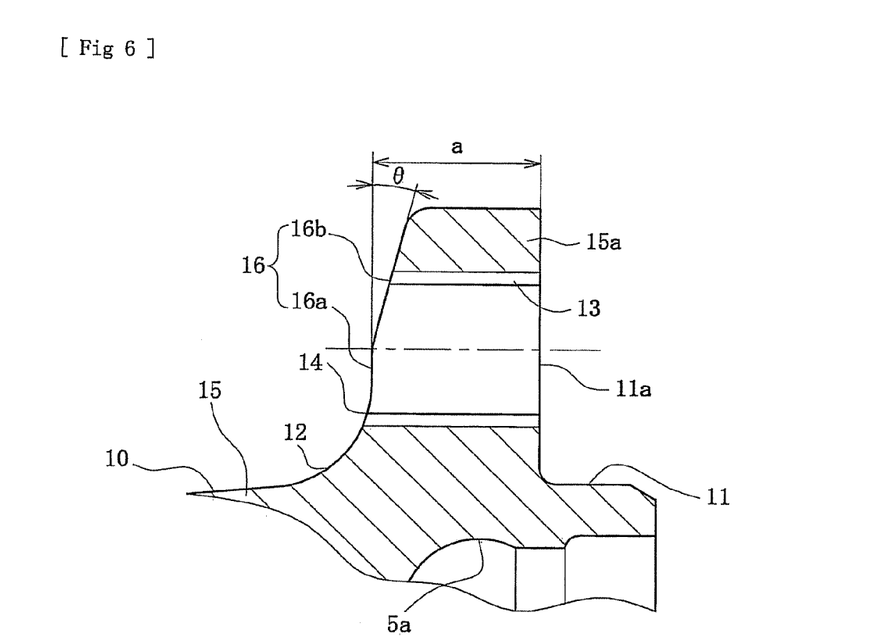
FIG. 6 is a partially enlarged view of the body mounting flange of the outer member of FIG. 4.
Figure 7:
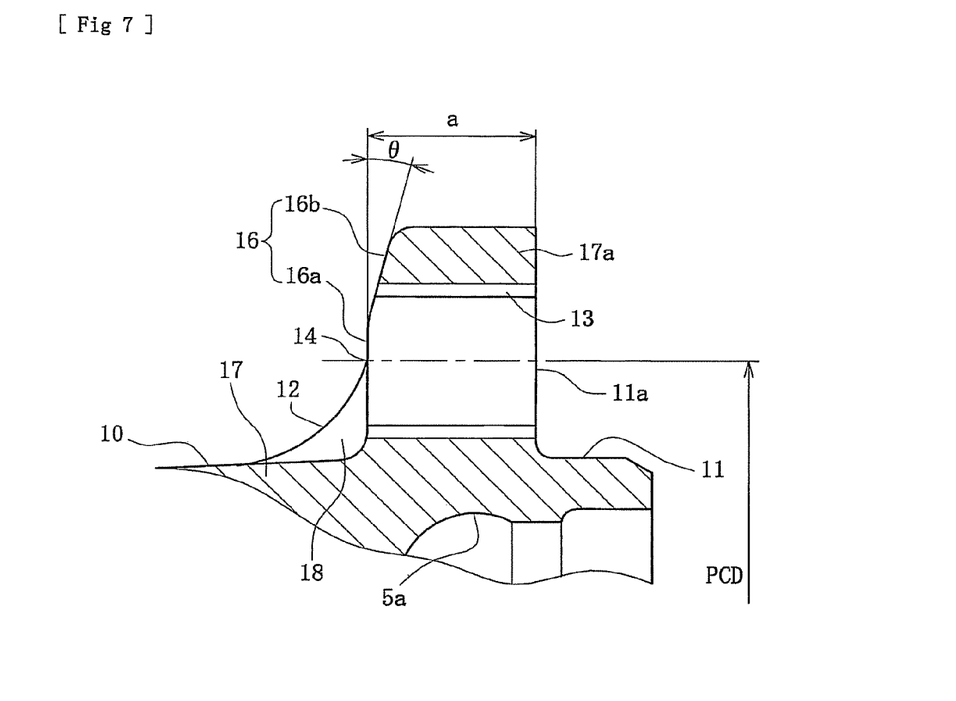
FIG. 7 is a partially enlarged view of a modification of FIG. 6.

FIG. 4 is a longitudinal section view of a second embodiment of the vehicle wheel bearing apparatus. FIG. 5 is a left side elevation view of the outer member of FIG. 4. FIG. 6 is a partially enlarged view of the body mounting flange of the outer member of FIG. 4. FIG. 7 is a partially enlarged view of a modification of FIG. 6. The same reference numerals are used in this embodiment to identify the same components and similar components having the same functions as those of the first embodiment.

The bearing apparatus for a vehicle wheel is a third generation type used on a driven wheel. It comprises an inner member 3 including a wheel hub 1 and an inner ring 2. An outer member 15 is fit onto the inner member 3, via double row rolling elements 4, 4.

The outer member 15 is made of medium/high carbon steel including carbon of 0.40-0.80% by weight such as S53C. It is integrally formed with a body mounting flange 15a on its outer circumference. The body mounting flange 15a is to be mounted on a knuckle (not shown) forming part of a suspension apparatus. The outer member 15 inner circumference has double row outer raceway surfaces 5a, 5a.

The circumference of the body mounting flange 15a of the outer member 15 is discontinuously formed to have a plurality (herein four) of projections. Each projection has a screw aperture 13 formed on it as shown in FIG. 5. The outer member 15 is secured to the knuckle by fastening bolts (not shown).

As shown in FIG. 6, the outer side flange surface 16 of the body mounting flange 15a has a flat vertical surface 16a relative to a longitudinal axis of the wheel hub 1. It extends radially outward from the base 14 of the flange and is formed by forging. A flat tapered surface 16b is formed with a predetermined inclined angle θ. Thus, the thickness of the body mounting flange 15a is gradually reduced radially outward. Similarly to the first embodiment, this makes it possible to reduce the size and weight of the wheel bearing apparatus without reducing the strength and rigidity of the outer member 15. Also, it fills throughout the body mounting flange 15a to its tip end with blank material during forging. Thus, this improves workability during forging. In addition, since a flat vertical surface 16a is formed at the base 14 of the flange, it is possible to accurately measure the thickness "a" of the body mounting flange 15a and thus to speedily and easily carry out the control of the dimensions.

A modification of the outer member 15 of FIG. 6 is shown in FIG. 7. The circumference of the body mounting flange 17a of the outer member 17 is discontinuously formed. In addition, a corner portion, between the body mounting flange 17a and the outer circumferential surface 10, is formed by forging as a rounded corner 12 with a circular arc cross-section. The base of the body mounting flange 17a is counter sunk at positions corresponding to the screw apertures 13 to form axially extending recesses 18 in the corner 12. These recesses 18 are formed by milling. The prepared holes are formed by drilling. The screw apertures 13 on the prepared holes are formed thereafter by tapping. The recesses 18 may be formed by previous forging other than milling. Thus, no trouble is caused in machining of the prepared holes or the screw apertures 13 although the screw apertures 13 would be formed by setting the PCD of the screw apertures 13 at a small diameter. Thus, a portion of each screw aperture 13 is continuous to the recess 18. Accordingly, the PCD of the screw apertures 13 can be set extremely small. Thus, a further reduction of the weight of the bearing apparatus can be achieved without diminishing the strength and rigidity of the outer member.

The vehicle wheel bearing apparatus of the present disclosure can be applied to any one of the second generation type through fourth generation type wheel bearing apparatus with an outer member integrally formed on its outer circumference with a body mounting flange to be mounted on a knuckle of a vehicle.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A vehicle wheel bearing apparatus comprising:
   an outer member formed with a body mounting flange on its outer circumference, the body mounting flange to be mounted on a knuckle forming part of a suspension apparatus, the outer member inner circumference includes double row outer raceway surfaces, the outer member including an outer diameter on its outboard side and an outer diameter on its inboard side wherein the outboard outer diameter and the inboard outer diameter are substantially the same;

an inner member includes a wheel hub and at least one inner ring or an outer joint member of a constant velocity universal joint, the wheel hub being formed on one end with a wheel mounting flange and on its other end with an axially extending cylindrical portion, the inner ring is press-fit onto the cylindrical portion of the wheel hub, the inner member is formed with inner raceway surfaces on its outer circumference, the inner raceway surfaces oppose the double row outer raceway surfaces;

double row rolling elements are freely rollably contained between the inner and outer raceway surfaces of the inner and outer members;

the body mounting flange is formed with a plurality of screw apertures to receive fastening bolts an inner side flange surface of the body mounting flange is formed by machining to have a flat vertical surface relative to a longitudinal axis of the wheel hub, an outer side flange surface of the body mounting flange is formed by forging to have a tapered surface formed extending across the screw apertures, the tapered surface of a predetermined inclined angle so that the thickness of the body mounting flange is gradually reduced radially outward.

2. The vehicle wheel bearing apparatus of claim 1, wherein the outer side surface of the body mounting flange has a flat vertical surface relative to a longitudinal axis of the wheel hub extending radially outward from a base portion of the body mounting flange.

3. The vehicle wheel bearing apparatus claim 1, wherein the inclined angle is within a range of 5-20°.

4. The vehicle wheel bearing apparatus of claim 1, wherein the thickness of the body mounting flange at the center of the screw aperture is set to have six or more times the nominal thread pitch of the screw aperture.

5. The vehicle wheel bearing apparatus of claim 1, wherein the circumference of the body mounting flange is discontinuously formed to have a plurality of projections, each projection includes a screw aperture, the outer member is formed at the inner side of the body mounting flange with a cylindrical outer fitting surface to be fit into the knuckle, the outer side of the body mounting flange includes a slightly tapered outer circumferential surface, and a transition portion, between the slightly tapered outer circumferential surface and the body mounting flange, is formed by forging with a corner portion continuous to the screw apertures having a circular arc cross-section.

6. The vehicle wheel bearing apparatus of claim 5, wherein an axially extending recess is formed in the corner portion at a position corresponding to each screw aperture.

7. The vehicle wheel bearing apparatus of claim 5, wherein the diameter of the cylindrical outer fitting surface is smaller than that of the slightly tapered outer circumferential surface.

* * * * *

UNITED STATES PATENT AND TRADEMARK OFFICE
CERTIFICATE OF CORRECTION

| | | |
|---|---|---|
| PATENT NO. | : 8,021,054 B2 | Page 1 of 1 |
| APPLICATION NO. | : 12/684186 | |
| DATED | : September 20, 2011 | |
| INVENTOR(S) | : Isao Hirai et al. | |

It is certified that error appears in the above-identified patent and that said Letters Patent is hereby corrected as shown below:

Column 7
Line 23 "wheel hub 1'" should be --wheel hub 1--

Signed and Sealed this
Seventh Day of February, 2012

David J. Kappos
*Director of the United States Patent and Trademark Office*